Dec. 4, 1934.    J. KIELY    1,982,671
JOURNAL BOX HUB LINER
Filed July 1, 1932
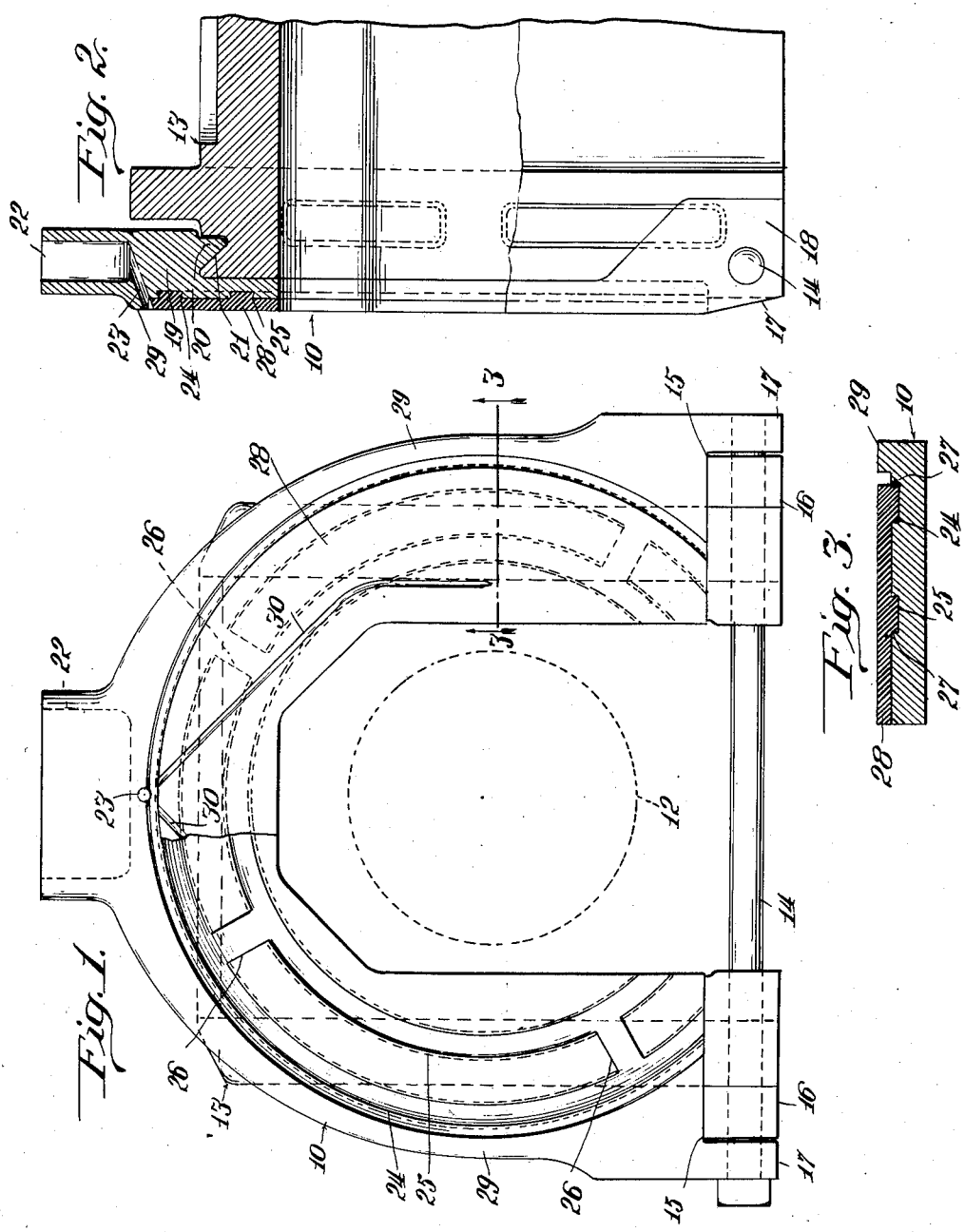
Witnesses
Milton Lenoir
H. A. Florell
Inventor
James Kiely,
By George Heidman
Attorney.

Patented Dec. 4, 1934

1,982,671

UNITED STATES PATENT OFFICE 1,982,671

JOURNAL BOX HUB LINER

James Kiely, Gallup, N. Mex.

Application July 1, 1932, Serial No. 620,459

1 Claim. (Cl. 308—165)

My invention relates to hub liners or wear plates for journal boxes and more particularly liners for the journal boxes of locomotives and especially for the journal or driving boxes of the engine trucks and the journal boxes of the trailing trucks of locomotives.

The object of the invention is to provide a liner or wear plate which may be easily applied to the hub or outer face of a journal box and which will maintain its proper snug relation with the journal box; with the outer face of the liner provided with a friction reducing surface and formed to permit proper distribution of lubricant to the hub contacting faces of the liner.

Another object of the invention is to provide a liner which may be applied to or removed from the journal box for replacement without the necessity of dismantling adjacent portions of the locomotive and therefore obviating the laborious method at present necessary, and thus eliminating the time and expense generally required in hub liner applications.

The objects and advantages of my invention will be readily comprehended from the detailed description of the accompanying drawing wherein:

Figure 1 is a front and sectional elevation of my improved liner shown applied to a journal box; the left hand side being in sectional elevation.

Figure 2 is a side elevation and partial central sectional view thereof and of a part of a journal box.

Figure 3 is a detail sectional view on the line 3—3 of Figure 1.

In the particular exemplification of the invention, my improved liner is shown applied to a journal or driving box of the type employing a cellar bolt; although it may be slightly modified to adapt it to any of the well known types of journal boxes employed.

Hub liners which are either cast or riveted on the face of the driving box, or secured in place by the use of screw-plugs or bolts, have been employed; while other liners of special construction requiring more or less accurate machining and fitting have also been suggested; but these have all been found objectionable because of the impossibility to apply after assembly of the various elements or running gear on a locomotive; practically all of such liners necessitating placing the locomotive over a drop pit where the wheels, the journals and the boxes can be lowered or dropped down, or some means employed to lift the locomotive off the wheels, in order to provide proper access to the hub faces of the journal boxes.

It is apparent that such operations entail considerable time, labor and expense.

The object of my invention is to provide a liner which can be easily applied and as readily removed in a horizontal or lateral direction by one man; and which, after having been applied, will maintain snug relation with the journal box.

My improved liner comprises a suitable sized plate 10, generally of bronze, of proper thickness and cut out centrally from the lower edge to fit over and receive the journal indicated at 12; the main portion of the plate having a flat rear face adapted to fit flush against the journal or driving box indicated at 13.

The plate is shown adapted to the well known type of journal box employing the usual cellar which is supported in place by the cellar bolt 14 and for that reason my improved plate at the lower end of both legs or side portions thereof is shown cut away at 15 to receive the journal box extensions 16 and to provide the depending portions 17 and the rearwardly disposed flanges 18; the portions 17 and flanges 18 being adapted to lap the sides of the journal box extensions 16 and are therefore apertured to receive the cellar bolt 14, as shown.

The upper end of the liner plate 10 on its rear face is of greater thickness to provide the enlargement or boss 19, see Figure 2, which is adapted to extend across the top of the journal or driving box 13; and this enlargement or boss 19 is shown provided with a depending lip or lug 20 tapered toward the bottom on the forward side of the lug 20.

This tapered lip or lug 20 is adapted to fit into a similarly tapered groove 21 formed transversely in the top of the box 13.

With the tapered groove 21 and lip 20, the plate is not only securely held in place, but the wedging action produced by the taper will tend to draw the liner up against the face of the box and constantly maintain the plate in snug fitting relation with the box and thus prevent play or movement of the plate. A comparatively simple and effective fastening method of the plate is not only provided, but one which enables the plate to be easily applied and as readily removed by simply lifting the liner sufficiently to clear the groove 21 in the top of the box, after withdrawing the cellar bolt 14 from the flange portions 18. The groove 21 and lip 20 need not be of material depth—merely a fractional part of an inch sufficing—and hence the required upward movement of the liner to clear groove 21, is materially less than the restricted clearance between the top of the journal or driving box and other equipment thereabove.

The boss or enlargement 19 is also disposed upwardly and cored to provide a lubricant receiving cavity 22 which is provided in its bottom with a downwardly and forwardly sloping port 23 terminating at the front face of the liner.

The front or outer face of the liner plate is provided with a pair of concentric grooves shown at 24 and 25 in the left hand side of the plate in Figure 1; and these grooves or channels are shown united by the radially disposed grooves or channels 26.

These channels or grooves 24 and 25 are preferably undercut as shown at 27 in Figure 3 to provide the dovetail gripping condition for the friction reducing outer facing of Babbitt metal, or the like, indicated at 28.

The Babbitt metal is poured onto the grooved face of the plate so as to fill the grooves and also to provide an outer surface extending from the inner perimeter of the plate to a point removed from the outer perimeter, where the plate is provided with a surrounding flange or shoulder as shown at 29 in Figure 3. As shown in Figure 3, the Babbitt metal will be firmly held by the dovetail relation and any tendency toward rotary movement or displacement of said metal or surface lining will be prevented by the radial grooves 26.

The surface lining 28 is then provided with oil or lubricant conveying grooves 30, leading from the port 23 downwardly on opposite sides of the journal opening in the plate and preferably to a point in line with the transverse axis of the journal indicated at 12, as shown in Figure 1.

The exemplification, shown in the drawing, is a practicable embodiment of the invention which has been described in terms employed for purposes of description and not as terms of limitation, as modifications are possible and may be made without, however, departing from the spirit of my invention.

What I claim is:

A hub liner comprising, in combination with a journal box provided in its top with a rearwardly tapered groove; a single piece plate adapted to extend flush with the end of the journal box and formed to provide journal box inter-engaging surface at its top and cut out centrally from the lower edge to accommodate a journal, the top of the plate and on its rear side being provided with an upstanding enlargement having a lubricant holding cavity provided in its bottom with a port adapted to discharge the lubricant onto the forward face of the plate, said enlargement having a depending lip whose forward face is rearwardly tapered and adapted to enter said tapered groove whereby the plate is automatically drawn toward the journal box and held in place, the opposite sides of the plate adjacent the bottom having rearwardly disposed apertured lobes adapted to receive the cellar-bolt of the journal box whereby upward movement of the plate is prevented, the forward face of the plate being provided with concentric undercut grooves and radial grooves connecting the concentric grooves; and a wear resisting lining disposed across the plate and in said grooves whereby rotary movement of the lining is prevented, the outer face of said lining having oil conveying grooves leading from said port downwardly toward opposite sides at the journal.

JAMES KIELY.